United States Patent
McCormick

(10) Patent No.: US 7,601,373 B2
(45) Date of Patent: Oct. 13, 2009

(54) EQUINE FEED PRODUCT

(76) Inventor: Richard McCormick, Woodville, Dunboyne, County Meath (IE)

( * ) Notice: Subject to any disclaimer, the term of this patent is extended or adjusted under 35 U.S.C. 154(b) by 706 days.

(21) Appl. No.: 10/502,509

(22) PCT Filed: Jan. 22, 2002

(86) PCT No.: PCT/IE03/00008

§ 371 (c)(1), (2), (4) Date: May 5, 2005

(87) PCT Pub. No.: WO03/061401

PCT Pub. Date: Jul. 31, 2003

(65) Prior Publication Data

US 2005/0214438 A1  Sep. 29, 2005

(30) Foreign Application Priority Data

Jan. 23, 2002  (IE) .................................... S020036

(51) Int. Cl.
*A23K 1/16* (2006.01)
*A23K 1/175* (2006.01)

(52) U.S. Cl. .................... 426/74; 426/623; 426/635; 426/656

(58) Field of Classification Search .............. 426/72, 426/74, 623, 635, 656
See application file for complete search history.

(56) References Cited

U.S. PATENT DOCUMENTS

| 4,166,867 | A | * | 9/1979 | Betz et al. ............... 426/73 |
| 5,236,717 | A | | 8/1993 | Vinci |
| 5,536,509 | A | | 7/1996 | Protti |
| 6,338,856 | B1 | | 1/2002 | Allen et al. |
| 6,451,370 | B1 | * | 9/2002 | Anderson ............... 426/635 |

FOREIGN PATENT DOCUMENTS

| AU | 753033 | * | 2/2000 |
| DE | 19617185 | | 10/1997 |
| SU | 1391570 A | * | 4/1988 |
| WO | WO 01/74173 | | 10/2001 |

OTHER PUBLICATIONS

Nutrient Requirements for Horses, The National Academy of Sciences, 1989, pp. 15-17, 23-24, 34, 43-48, 95.*
Lawrence, Virginia Cooperative Extension, Animal and Poultry Sciences, Publication 406-473, 10 pages, 2000.*
"Horse Science", downloaded from http://4h.ifas.ufl.edu/curriculum/projects/animal_sci/horsepubs.htm, 8 pages, 1989, published by National 4-H Council, MD 20815.*
Article entitled "The Effect of Supplemental Lysine and Threonine on Growth and Development of Yearling Horses"; Graham et al.; Journal of Animal Science; vol. 72; pp. 380-386 (1994).
Article entitled "Influence of Protein Level and Quality on the Growth and Development of Yearling Foals"; Ott et al.; Journal of Animal Science; vol. 49; No. 3; pp. 620-628 (1979).

* cited by examiner

*Primary Examiner*—C. Sayala
(74) *Attorney, Agent, or Firm*—Baker Donelson Bearman Caldwell & Berkowitz, PC

(57) ABSTRACT

An equine oat-balancing feed supplement comprising a mix of substances including lysine, iodine, copper, magnesium, zinc and calcium is provided. The supplement further includes one or more of Folic Acid, Nicotinic Acid, Pantothenic Acid, Thiamine, Riboflavin, Pyridoxine, Biotin, Cobalt, Selenium, Methionine, Threosine, Choline, Iron, Manganese, an inert material such as cereal wheat and Vitamins A, $B_{12}$, D, C, E, K. The oat-balancing feed supplement is administered to horses in an amount dependent on the age of the animal, together with an oat-based diet. The health and condition of horses has been found to improve an commencement of the intake of the supplement and in particular, racing horses have been observed to have improved performance at races when on the supplement.

13 Claims, No Drawings

EQUINE FEED PRODUCT

The present invention relates to an equine feed product and in particular to a feed product that is used as a feed supplement.

Four products are derived from the oxidation of foodstuffs in the Kreb's Cycle, namely water, carbon dioxide, energy and heat. Carbohydrate sources vary in their ability to derive heat in the oxidation process. Oats produce less heat than barley, which in turn produces less heat than maize. The production of excess heat by a foodstuff is an undesirable side effect, which may result in excess sweating giving rise to electrolyte loss. This side effect may adversely affect the performance of a horse that is undergoing intensive training and subsequently partaking in horse-racing events.

Furthermore it is known that feedstuffs producing high energy in bovines cause the overall pH level in the intestine to decrease (Merck Manual). Thus there is an increased possibility of gastrointestinal ulceration and/or abomasal ulcers occurring. It is believed that this effect can be translated from cattle to horses. In addition, the most common cause of laminitis in horses is carbohydrate overload, i.e. when a horse overeats on grain or corn. It is also known that horses fed on barley have an increased risk of enteritis, laminitis and colic, whilst horses fed on an oat based diet are less likely to suffer these side effects. Therefore high quality heavy busheling oats are the safest source of high-energy feeds to administer to horses and pose the least risk of enteritis, laminitis and colic. However a diet consisting solely of oats is deficient in some key nutrients to varying degrees.

This invention relates to a feed product that is used as an oat-balancing supplement.

It is common practice to supplement a horse diet with balancers. Such equine products on the market include Twydil Racing (Pavesco, Basel), Kossolian (Day Son & Hewitt, England) and Gowla (Greencore Agrisales). Twydil Racing contains a balance of amino acids, trace elements, magnesium and vitamins to specifically supplement a diet consisting of a basic ration of oats, hay, bran or the like. Furthermore the manufacturers suggest that an adult horse in intensive training ideally requires a daily supplement comprising Twydil Racing and a further supplement Twydil PMC, where Twydil PMC guarantees the continuous bioavailability of calcium and phosphorus. Twydil PMC also regulates the metabolism of the mesenchymatous tissues and stimulates the metabolism of oestoblasts, chondrocytes and fibroblasts. However, it is an inconvenience to have to co-ordinate both supplements into a horses diet.

Kossolian is a balanced supplement that contains iodised minerals, spices, trace elements and vitamin $B_{12}$. Kossolian is widely used by racehorse trainers to combat the effects of high feeding and to prevent staleness. It is recommended that Kossolian be administered to the horse daily mixed well into moistened feed. Gowla is a supplement that contains a mixed balance of proteins, oils, fibre, minerals, trace elements and vitamins. Despite this there are deficiencies when giving a horse the above feeds as a balancing agent in conjunction with an oat based diet. These deficiencies affect the ability performance of a horse when racing.

The present invention seeks to alleviate the problems associated with the above feed regimes.

Accordingly, the present invention provides an equine oat-balancing feed supplement comprising a mix of components including lysine, iodine, copper, magnesium, zinc and calcium, where the quantity of lysine present in the oat-balancing feed supplement fed to the animal per day ranges between 3.00 g and 18.00 g according to the age of the animal.

Advantageously the components are present in the following ranges relative to 1 g of lysine.

| | |
|---|---|
| Iodine | $1.4 \times 10^{-1} - 3.0 \times 10^{-1}$ g |
| Copper | $5.3 \times 10^{-3} - 7.9 \times 10^{-3}$ g |
| Magnesium | $2.1 \times 10^{-1} - 3.2 \times 10^{-1}$ g |
| Zinc | $1.6 \times 10^{-2} - 2.4 \times 10^{-2}$ g |
| Calcium | $5.3 \times 10^{-1} - 8.0 \times 10^{-1}$ g |

The quantity of Iodine, Copper, Magnesium, Zinc and Calcium in the oat-balancing feed supplement fed to each animal is calculated by multiplying the quantity of each component by the quantity of lysine present in the oat-balancing feed supplement being fed to the animal.

Advantageously, the mix of components are present in the following optimal ratio calculated relative to 1 g lysine:—

| | | |
|---|---|---|
| $6.6 \times 10^{-4}$ g | of | Iodine |
| $6.6 \times 10^{-3}$ g | of | Copper |
| $1.6 \times 10^{-1}$ g | of | Magnesium |
| $2.0 \times 10^{-2}$ g | of | Zinc |
| $6.6 \times 10^{-1}$ g | of | Calcium |

The components are combined together in the above optimal ratios.

The supplement may ether include one or more of the following substances:

| | |
|---|---|
| Vitamin A | Vitamin $B_{12}$ |
| Vitamin D | Biotin |
| Vitamin E | Vitamin C |
| Vitamin K | Cobalt |
| Folic Acid | Selenium |
| Nicotinic Acid | Methionine |
| Pantothenic Acid | Threonine |
| Thiamine | Choline |
| Riboflavin | Iron |
| Pyridoxine | Manganese |

, each of the further substances being present in the following ratios and ratio ranges relative to 1 g lysine

| | Optimal Ratio | Optimal Ratio Range |
|---|---|---|
| Vitamin A | $3.3 \times 10^3$ IU/g | $2.7 \times 10^3 - 3.9 \times 10^3$ IU/g |
| Vitamin D | $3.3 \times 10^2$ IU/g | $2.7 \times 10^2 - 3.9 \times 10^2$ IU/g |
| Vitamin E | $1.3 \times 10^2$ IU/g | $1.0 \times 10^2 - 1.6 \times 10^2$ IU/g |
| Vitamin K | $3.3 \times 10^{-4}$ g | $2.7 \times 10^{-4} - 3.9 \times 10^{-4}$ g |
| Folic Acid | $1.0 \times 10^{-2}$ g | $0.8 \times 10^{-2} - 1.2 \times 10^{-2}$ g |
| Nicotinic Acid | $6.6 \times 10^{-3}$ g | $5.3 \times 10^{-3} - 7.9 \times 10^{-3}$ g |
| Pantothenic Acid | $2.6 \times 10^{-3}$ g | $2.1 \times 10^{-3} - 3.1 \times 10^{-3}$ g |
| Thiamine | $2.6 \times 10^{-3}$ g | $2.1 \times 10^{-3} - 3.1 \times 10^{-3}$ g |
| Riboflavin | $3.2 \times 10^{-3}$ g | $2.6 \times 10^{-3} - 3.8 \times 10^{-3}$ g |
| Pyndoxine | $1.6 \times 10^{-3}$ g | $1.3 \times 10^{-3} - 1.9 \times 10^{-3}$ g |
| Vitamin B12 | $1.3 \times 10^{-3}$ g | $1.0 \times 10^{-3} - 1.6 \times 10^{-3}$ g |
| Biotin | $2.6 \times 10^{-4}$ g | $2.1 \times 10^{-4} - 3.1 \times 10^{-4}$ g |
| Vitamin C | $2.6 \times 10^{-1}$ g | $2.1 \times 10^{-1} - 3.1 \times 10^{-1}$ g |
| Cobalt | $2.6 \times 10^{-4}$ g | $2.1 \times 10^{-4} - 3.1 \times 10^{-2}$ g |
| Selenium | $1.3 \times 10^{-4}$ g | $1.0 \times 10^{-4} - 1.6 \times 10^{-4}$ g |
| Methionine | $3.3 \times 10^{-1}$ g | $2.6 \times 10^{-1} - 4.0 \times 10^{-1}$ g |
| Threonine | $3.3 \times 10^{-1}$ g | $2.6 \times 10^{-1} - 4.0 \times 10^{-1}$ g |
| Choline | $5.3 \times 10^{-2}$ g | $4.2 \times 10^{-2} - 6.4 \times 10^{-2}$ g |
| Iron | $4.0 \times 10^{-2}$ g | $1.6 \times 10^{-2} - 2.4 \times 10^{-2}$ g |
| Manganese | $2.0 \times 10^{-2}$ g | $1.6 \times 10^{-2} - 2.4 \times 10^{-2}$ g |

The feed product is not limited to these substances and other substance which are suitable or desirable as a foodstuff may be included.

Advantageously, a filling material is combined with the components and any further substances which could be combined with the components. Ideally, the filling material does not interfere with any of the six central substances or further substances. It is preferable for the filling material to be cereal wheat, however any suitable material that suggests itself to a person skilled in the art can be used.

Ideally, the gross weight of the oat-balancing feed supplement ranges between 5.4 g and 8.0 g relative to 1 g of lysine. Clearly, the feed supplement can be made up to any desired gross weight. This is done by multiplying the ideal gross weight by a factor to bring it to its desired gross weight and then multiplying the ratio quantities of each of the components and/or substances by that same factor to attain the desired quantities of each of the components and/or substances.

Preferably, the feed supplement is administered to the horse in conjunction with any oat-based diet. Ideally, the feed supplement is fed to the horse in an amount having regard to its age. For example, a foal aged 3-6 months would receive 3.75 g±20% of lysine a day from the feed supplement, therefore ideally the foal would receive 25 g±20% of the feed supplement a day. A foal aged 6-12 months would receive 7.5 g±20% of lysine a day from the feed supplement, therefore ideally this foal would receive 50 g±20% of the feed supplement a day. In the case of a yearling aged 12-18 months, 11.25 g±20% of lysine a day would be suitable, therefore ideally this animal would receive 75 g±20% of the feed supplement a day. An adult aged 18+ months would receive 15 g±20% of lysine a day from the feed supplement, therefore ideally this adult would receive 100 g±20% of the feed supplement a day. The amount of feed supplement given can be adjusted to take account of the sex and weight of the animal.

Oats vary in quality due to the environment in which the oats are grown. It is commonly known within the industry that Canadian Oats or American Oats have better nutritional value than either Australian or Irish Oats. Top quality Canadian/America Oats comprise a busheling weight at 50 lb (22.7 kg) with 11% moisture content. Australian Oats have a busheling weight of less than 50 lb (22.7 kg) with 11% moisture content and Irish oats have a low busheling weight of less than 45 lb (20.4 kg) and a high moisture content at 14%.

Initially experiments were conducted where possible on each of the components in order to determine the optimum levels of each substance required by a horse. Ideally, the determined optimum level is used to calculate the weight of each substance required in the feed product.

EXAMPLE ONE

Lysine, methionine and threonine are essential amino acids. Trials were conducted on eleven horses (eight geldings and three fillies) where the horses were randomly split into three groups. Two groups contained four horses and the third group contained three horses. The horses varied in age between three and eight years old with an average body weight of 500 kg. The Packed Cell Volumes (PCVs) and haemoglobin levels of each horse were tested. Visual observations such as coat colour and racecourse performances were also monitored. In these Example all three amino acids were administered to the horses together as all three amino acids are essential. The quantities of methionine and threonine were constant for each group whilst the quantity of lysine was varied between the groups. Oats are deficient in lysine therefore it is necessary to boost the horses intake of lysine while maintaining a constant level of methionine and threonine Quantities of Amino Acid Administered to Horses Daily

| Group | No. of Horses | Lysine g/day | Methionine g/day | Threonine g/day |
|---|---|---|---|---|
| 1 | 4 | 5 | 5 | 5 |
| 2 | 4 | 10 | 5 | 5 |
| 3 | 3 | 15 | 5 | 5 |

It was determined that 15 g/day of lysine for a horse of average weight (500 kg) proved to have the optimum response, the horses tested on average had PCV levels in excess of 42 per cent per liter, haemoglobin levels in excess of 14 g per deciliter, optimum coat colour and racecourse performance.

Ideally, a pure lysine source is used to provide lysine for this feed supplement. Alternatively lysine can be sourced from either soya bean meal or flax seed. Other sources of lysine that are known to a person skilled in the art can also be used. Soya bean meal is sometimes considered to have goitrogenic factors associated with it. However obtaining lysine from flaxseed is quite labour intensive and for this reason despite the disadvantages of soya bean meal many choose it over flax seed.

EXAMPLE TWO

Iodine is required for the production of thyroxine, which is produced in the thyroid gland. Thyroxine is a haematinic agent and is necessary for the production of red blood cells. Prior research in which the blood samples of six poor performing racehorses were analysed indicated that the horses were anaemic. Thyroxine was administered to each horse and within a matter of weeks the red cell parameters were all elevated (Waldron E, Mease, New Bolton, Pa., 1979). In this research, it is preferred to administer iodine to the horse and allow the thyroid gland manufacture thyroxine.

Three levels of iodine were administered to thoroughbred horses:

1. 1 mg/day Iodine.
   The red blood cell parameters were low, the PCV level was below 40 per cent per liter and the Haemoglobin level was below 12 g per deciliter.
2. 10 mg/day Iodine.
   The red blood cell parameters were determined to be at an optimum level, the PCV level was between 42 and 45 per cent per liter whilst the Haemoglobin level was between 12 and 14 g per deciliter.
3. 30 mg/day Iodine.
   After three weeks the horses had a diminished appetite and were indifferent about feed. Excess iodine is known to depress and damage the thyroid gland.

EXAMPLE THREE

Copper is essential in the growth and development of many systems. Horses in particular are considered to have a high tolerance of copper, unlike cattle and sheep. Ideally copper supplements are delivered to a horse in one of two forms, as an inorganic copper salt, for example, copper sulfate or as chelated copper. However where molybdenum predominates in grass or hay, antagonism towards oral inorganic copper will occur. As a consequence a growing horse can develop one or more of the following; epiphystitis, decreased red cell production, poor coat colour or lack of thrive. It is vital that a growing horse has sufficient levels of copper to maintain red cell production and correct bone development, particularly at the physeal growth stage.

Zinc is necessary for a number of systems within the body, most notably the immune system. Copper and Zinc are considered to have common absorption sites. Excess quantities of one element may interfere with the absorption of the other. The desired optimum ratio of zinc to copper is 3:1.

A trial was conducted on ten thoroughbred yearlings (six colts and four fillies) using optimum levels of copper and zinc. The horses were divided into two groups with five horses in each group. The trials were conducted over a period of ten weeks. During this period the horses were stabled, each horse was handwalked for one hour a day and put to grass for three hours a day. The grass was analysed and found to have a high molybedenum content.

The copper used in the feed supplement for the first group of five horses was inorganic copper, copper sulfate whilst the copper used in the oat-balancing feed supplement for the second group was chelated copper. The horses has an average body weight of 425 kg. The horses were fed a combined diet of Ryegrass Hay, Rolled Irish Oats, Cooked Flaxseed and the feed supplement. At the end of the trial periods the horses average body weight had increased to approximately 475 kg.

In trial one, 100 g of the oat balancing feed supplement was fed to each horse daily. There was 100 mg of inorganic copper in present in the oat balancing feed supplement.

Group 1: 100 mg/day Inorganic Copper & 300 mg/day Chelated Zinc

The horses experienced lack of thrive, decreased red cell production and poor coat colour.

In the second group the five horses were fed the same combined diet however the copper present in the feed supplement was chelated copper. Again there was 100 mg of copper present in 100 g of the oat balancing feed supplement.

Group 2: 100 mg/day Chelated Copper & 300 mg/day Chelated Zinc

The horses experienced normal thrive, normal PCV levels in excess of 42 per cent per liter and excellent coat colour.

EXAMPLE FOUR

Magnesium is considered to be an essential daily mineral in equine diets. A deficiency of magnesium in the diet in conjunction with any condition that will produce stress can lead to Stress Tetany. An example of a stress-causing condition is transportation of the horse over long distances. Initially this was observed in a horse that was being fed a magnesium deficient diet. After a period of exercise and transportation for a period of one hour, the horse exhibited tetanic symptoms. Some weeks later the same horse was transported to another location. The journey lasted approximately four hours. Again the horse exhibited Stress Tetany. A magnesium supplement was introduced into the horse's diet and the problem was successfully resolved.

In a preferred embodiment of the present invention magnesium oxide is used to provide the magnesium. Alternatively magnesium sulphate or any suitable magnesium source can be used.

Trials conducted where the quantity of magnesium introduced into the horse was varied from 2 g/day of magnesium oxide to 4 g/day of magnesium oxide. The horses reached optimum performance using 4 g/day of magnesium oxide. An improvement in the temperament of the horse was observed in conjunction with weight gain and better coat colour.

EXAMPLE FIVE

It is believed that high levels of calcium in a horses diet leads to the condition known as Osteochondrosis, (Racehorses at Risk, Dr. Lennart Krook, Cornell University, USA). A horse that is fed a diet of oats without a calcium supplement is susceptible to laminitis.

A number of trials were conducted on horses throughout various stages of development fed with varying levels of calcium. The first two trials were conducted on twelve foals over a nine month period. The trial began when the foals were aged three months. The foals (at three months) had an average body weight of 118 kg. Each foal was fed 2.5 g of Calcium a day within a balanced diet for a period of three months. The Calcium dosage was then increased to 5.0 g a day for a further period of six months as the foals average weight had increased to 240 kg.

The third trial comprised a group of ten yearlings with average weight 425 kg body. The yearlings were fed 7.5 g of Calcium a day over a period of ten weeks. The fourth trial was conducted on adult horses with average body weight of 500 kg aged 18+ months. Each adult horse was fed 10.0 g of Calcium per day.

The results of these trials are synopsised below:

| Age of horse | Average weight | Quantity of Calcium |
| --- | --- | --- |
| Foals 3-6 months | 118 Kg at 3 months<br>240 Kg at 6 months | 2.5 g/day |
| Foals 6-12 months | 240 Kg at 6 months<br>375 Kg at 12 months | 5.0 g/day |
| Yearlings 12-18 months | 375 Kg at 12 months<br>475 Kg at 18 months | 7.5 g/day |
| Adult horses 18+ months | 500 Kg at 18+ months | 10.0 g/day |

The horses exhibited clinically adequate bone development, correct limb formation and normal weight gain.

A preferred embodiment of the invention incorporates the results of the previous examples. The six central substances are combined together in the following quantities when the feed supplement is made up to a gross weight of 2 kg.

|  | Quantity |
| --- | --- |
| Lysine | 300 g |
| Iodine | 200 mg |
| Copper (Chelated Form) | 2,000 mg |
| Magnesium | 48 g |
| Zinc (Chelated Form) | 6,000 mg |
| Calcium | 200 g |

The preferred embodiment incorporates magnesium in the form of magnesium oxide and calcium in the form of calcium carbonate. This is due to the beneficial antacid effect of combined magnesium oxide calcium carbonate.

The following substances comprise non-essential components of the feed supplement and whilst it is beneficial to have each of the substances present, one or more can be omitted. In the preferred embodiment each substance is present in the quantities outlined below.

|  | Quantity |
| --- | --- |
| Vitamin A | 1 million international units |
| Vitamin $B_{12}$ | 40,000 mg |
| Vitamin C | 80 g |
| Vitamin D | 100,000 international unit |
| Vitamin E | 40,000 international units |
| Vitamin K | 100 mg |
| Folic Acid | 3,000 mg |
| Nicotinic Acid | 2,000 mg |
| Pantothenic Acid | 800 mg |
| Thiamine | 800 mg |
| Riboflavin | 960 mg |
| Pyridoxine | 480 mg |
| Biotin | 80 mg |
| Cobalt | 80 mg |
| Selenium | 40 mg |
| Methionine | 100 g |
| Threonine | 100 g |
| Choline | 16,000 mg |
| Iron (Chelated Form) | 12,000 mg |
| Manganese (Chelated Form) | 6,000 mg |

The balance of material required to bring the feed supplement to its gross weight in this preferred embodiment comprises an inert material for example cereal wheat that does not interfere with the active substances i.e. the amino acids, vitamins, minerals and trace elements of the feed supplement.

It will of course be understood that the feed supplement is not restricted to a gross weight of 2 kg. The feed supplement can be made to any desired quantifiable weight provided the weight/weight ratio's are consistent. For example:—

| Lysine | Gross Weight of Feed Supplement |
| --- | --- |
| 150 g | 1 kg |
| 300 g | 2 kg |
| 450 g | 3 kg |
| 600 g | 4 kg |

Ideally the preferred embodiment of the feed supplement is administered to the horses in conjunction with an oat based diet with regard to their age. For example, a feed programme may comprise of the following:

| Horse | Age | Quantity of Feed Supplement |
| --- | --- | --- |
| Foals | 3-6 months | 25 g/day |
| Foals | 6-12 months | 50 g/day |
| Yearlings | 12-18 months | 75 g/day |
| Adults | 18 months+ | 100 g/day |

Experimental Trials using the preferred embodiment of the feed supplement were carried out on horses at various stages of development.

EXAMPLE SIX

Twenty-one thoroughbred yearlings were divided into two groups. The first group was a control group, thus was not fed the feed supplement whilst the second group was fed the feed supplement. This trial lasted for a period of six months. Both groups were of similar average weight which ranged between 475 kg and 525 kg.

Group 1 comprised of six colts and four fillies. The horses were fed a diet of proprietary compound feed, Ryegrass hay and balanced electrolytes. Group 2 comprised of six colts and five fillies. The horses were fed freshly rolled oats, feed supplement according to the invention, Ryegrass hay and balanced electrolytes. The total quantity of oat-balancing feed supplement given was 100 g/day, where 50 g was given each morning and evening.

The PCV and Haemoglobin levels of both groups were tested.

| Group 1 | Average PCV level | 39 percent per litre |
| --- | --- | --- |
|  | Average Haemoglobin Level | 12.2 g per decilitre |
| Group 2 | Average PCV level | 42 percent per litre |
|  | Average Haemoglobin Level | 14 g per decilitre |

Visual observations determined that Group 2 had a better coat colour, were leaner in condition, easier to train and had better market acceptance.

EXAMPLE SEVEN

This trial was conducted on a stud farm with a history of crooked foals with poor market acceptance as yearlings. Detailed analysis of the soil and grass of the farm were undertaken. As a consequence, a customised mineral supplement for the farm was developed. The customised mineral supplement balanced the deficiencies in the grass and was provided in the field as oral paste the grazing season.

In addition, twelve thoroughbred foals (seven colts and five fillies) were placed on a diet of Rolled Oats (1 kg/day) and oat-balancing feed supplement (25 g/day) two weeks prior to weaning. Post weaning the foals were placed on a diet of rolled oats (2-3 kg/day) and oat-balancing feed supplement (50 g/day) for a period of four months. The foals gained an average 24 kgs/month during the four months period. When sold as yearlings there was good market acceptance.

EXAMPLE EIGHT

Twelve horses fed rolled oats, Ryegrass hay, oat-balancing feed Supplement (100 g/day) and balanced electrolytes over a four year period exhibited average PCV levels of 42 per cent per liter and Haemoglobin levels of 14 g per deciliter. Initial visual observations after four weeks showed the horses having improved coat colour and improved racecourse performance.

EXAMPLE NINE

A four year old filly with poor coat colour, poor appetite and questionable temperament was placed on a diet of rolled oats balanced electrolytes and oat-balancing feed supplement (10 g/day). After thirty days, visual observations indicated an improved coat colour, appetite and temperament. Improved racecourse performance was also observed.

EXAMPLE TEN

A four year old gelding was placed on a diet of Canadian Oats, Ryegrass hay and oat-balancing feed supplement (100 g/day). After a period of one week the horse ran unplaced over a distance of 1600 m. After a three week period the horse ran second over the same distance. After a five week period the horse won by nine lengths and lowered the track record by two seconds over the same distance.

EXAMPLE ELEVEN

Three trials were conducted in which the horses used in the trials were fed different quality oats in conjunction with the preferred embodiment of the oat balancing feed supplement.
(a) A horse (filly) with starting weight 500 kg was fed a diet of hay, electrolytes, Canadian Oats and 80 g per day of the feed supplement. After four weeks the horse won a race and after a further two weeks was placed third in a Grade III race in the United States.
(b) Four horses were fed a diet of Australian Oats and 100 g per day of the feed supplement. Each horse exhibited excellent RBC parameters, Haemoglobin levels and PCV levels. Of the two horses that were raced whilst on this dietary regime, one horse ran six times, won three races, ran second in two races and came fourth in one race. The second horse ran twice and was placed first in one race and second in the second race.
(c) Two horses were fed a diet of Irish oats plus 120 g per day of the feed supplement. The first horse (a five year old gelding) ran four times whilst on this dietary regime and won once. The second horse (a four year old filly) ran three times whilst on this dietary regime and won twice.

These results all represented improvements on the forms of the horses prior to feeding with the supplement of the invention.

Most horses running in the United States run in different types of races. There are maiden races, claiming races, allowance races and stakes races.

Horses that have not previously won a race, are entitled to run in maiden races.

In a claiming race each horse is pre-stated to have a certain monetary value. Any horse is subject to a claim for it's entered price by any licensed owner of a horse duly registered for racing at the track or such owner's licensed authorised agent, or holder of a claiming authorisation issued by a steward. Horses of equal claim value run together in the appropriate race. If a horse's form improves, the horse is then run in a higher value claiming race. A horse can only be claimed before the start of a race.

A horse must have won a maiden race in order to run in an allowance race. Allowance races are divided into categories where the horses running in each category have not won or have won one race, two races and so forth. Occasionally there are allowance races run in which two or three of the horses running are permitted to be claimed. These are commonly known as "allowance or claiming" races.

By contrast to the position for maiden, allowance and claiming races, a fee must be paid for a horse to run in a stakes race. Therefore generally only the top runners enter this class of race. Commonly horses that have raced in and possibly won different allowance race categories enter stakes races.

Generally a horse's racing performance peaks between the ages of two and four years old. Therefore usually horses running in both allowance and stakes races are within that age bracket. After a horse's racing performance has peaked, or if the horse's performance is not of a high enough standard to run in either an allowance or stakes race, the horse runs in a claiming race. It is therefore not usual to see a horse's performance improve considerably when running in claiming races.

EXAMPLE TWELVE

The following are a series of results on a number of horses from one stable run in United States claiming races, which were fed a diet incorporating the feed supplement of the present invention. The percentage ratio of runners to winners in this stable was 13% prior to any of the horses within the stable using the feed supplement. Currently the same percentage ratio is in excess of 26%

A: 7 Year Old Bay Horse
The horse ran in a $10,000 claiming race and failed to win. The horse changed trainers and was placed on a diet supplemented with the oat-balancing feed supplement. Within five weeks the horse won a $10,000 claiming race and was claimed (that is to say, bought for $10,000). The new owner did not continue the oat-balancing feed supplement diet. The horse ran three weeks later in a $16,000 claiming race, where he was placed fourth. The horse was reclaimed by the trainer who used the oat-balancing feed supplement diet and the oat-balancing feed supplement was reintroduced into his diet. After five weeks, the horse raced in a $16,000 claiming race and won. After a further three weeks the horse raced in a $18,000 claiming race and finished fourth.

B: 5 Year Old Bay Mare
After approximately five weeks on an oat based diet supplemented with oat-balancing feed supplement, this horse won a $50,000 claiming race. The horse was claimed and the new trainer maintained the oat-balancing feed supplement in her diet. After a further four weeks the horse ran in and won by six lengths a $60,000 claiming race.

C: 8 Year Old Chestnut Gelding
This horse was claimed for $25,000 and immediately placed on a diet supplemented with oat-balancing feed supplement. Within five weeks the horse ran in and won a $35,000 claiming race.

D: 5 Year Old Bay Gelding
The horse was placed on an oat-based diet supplemented with oat-balancing feed supplement after failing to win eleven previous starts. Nine weeks later the horse was placed fifth in a $65,000 claiming race. Approximately two weeks after, the horse won an allowance race of 1 1/16 miles.

E: 3 Year Old Bay Colt
This horse was claimed in a $35,000 claiming race in which the horse finished $6^{th}$ after being beaten by 12 lengths. The horse was then placed on an oat based diet which was supplemented by oat-balancing feed supplement. Over a period of three months the horse ran five races of different standards. The first race was a $16,000 claiming race, ran within two weeks of starting the new dietary regime. The horse won. The second and third races were $25,000 claiming races. The second race was a closely run race with the horse being beaten to third place by a neck. The horse won the third race by two lengths. The fourth race was a $35,000 claiming race in which the horse finished sixth. The fifth race was a $25,000 claiming race which the horse won.

F: 6 Year Old Chestnut Mare
The horse was claimed in a $25,000 claiming race in which she finished sixth, being beaten by ten lengths. The horse subsequently ran in a $35,000 claiming race and again finished sixth, being beaten by fifteen lengths. After this the horse was placed on a diet supplemented with oat-balancing feed supplement. Since being placed on the new dietary regime the horse has run in four $25,000 claiming races. The horse finished third in the first and second races beaten by six lengths and two lengths respectively, second in the third race being beaten by a head, and finally winning the fourth race by seven lengths. The horse subsequently ran and won a $35,000 claiming race fifteen and a half weeks after first being placed on the supplemented diet.

G: 4 Year Old Colt

This horse was claimed in a $35,000 claiming race in which the horse finished fourth. The horse was then placed on a diet supplemented with oat-balancing feed supplement. Within a couple of weeks the horse ran in a $50,000 claiming race and finished third being beaten by ten lengths. After a further period of four weeks the horse again ran a $50,000 claiming race and won by half a length.

H: 5 Year Old Chestnut Horse

This horse was claimed in a $12,500 claiming race in which he finished third, being beaten by three lengths. Within a period of four weeks the horse ran in two allowance races finishing third in both. The horse was then placed on a oat-based diet supplemented with oat-balancing feed supplement. Within four weeks the horse ran in an allowance race and won by five lengths. During a further period of four weeks the horse ran in two further allowance races, but finished fifth and sixth respectively. It was noted in both of these races that the track conditions were very poor. The horse has since run in another allowance race, which he won by six lengths.

I: 6 Year Old Bay Mare

This horse was claimed for $12,500. The horse won the claiming race by a length. The horse was placed on the feed supplement. Approximately four weeks later the horse ran in a $16,000 claiming race and won it by four and a quarter lengths.

J: 5 Year Old Bay Mare

This horse won a $11,500 claiming race by two lengths. The horse was claimed and placed on the feed supplement. Two weeks later the horse ran in a $16,000 claiming race and won by approximately ten lengths.

K. 6 Year Old Chestnut Horse

The horse was placed on an oat-based diet supplemented with the feed supplement after failing to win five previous starts. One of the failed starts was a $16,000 claiming race. Approximately two weeks after the horse was placed on this diet, the horse was placed second in an allowance race. The horse subsequently ran in four further allowance races over an eleven week period. The horse won three of these races and finished second in the other race.

L. 4 Year Old Chestnut Filly

The horse ran and won a $35,000 claiming race by two lengths. The horse was claimed and placed on the feed supplement. Approximately 3 weeks after being placed on the feed supplement the horse ran in an allowance race and won by four lengths.

M. 3 Year Old Chestnut Filly

This horse was claimed for $35,000. The horse won the claiming race by two lengths, after which she was immediately placed on the feed supplement. The horse ran in four allowance races over a twelve week period, the first of these races was approximately two weeks after the horse started on the feed supplement. The horse was beaten by fifteen lengths to third place. The horse was also beaten in the three other allowance races, however the distance the horse was beaten by was a neck, four lengths and two lengths respectively. The horse subsequently ran in another allowance race and won by three lengths.

N. 3 Year Old Dark Bay Filly

The horse was claimed in a $25,000 claiming race, in which she was placed second Over the following six week period the horse ran in the following races; an allowance race after two weeks on the supplement where the horse was placed sixth, a $20,000 claiming race after six weeks on the supplement, where the horse was beaten by two lengths to fifth place. Within days of the previous race the horse ran in a $15,000 claiming race which the horse won by four lengths.

O. 4 Year Old Bay Colt

The horse was claimed in a $12,500 claiming race, in which the horse finished sixth. After three weeks on the feed supplement the horse won a $25,000 claiming race by two lengths.

P. 5 Year Old Bay Horse

This horse won a $16,000 claiming race by a nose She subsequently won an allowance race by a length after being on the oat-based diet supplemented with the feed supplement for a period of five weeks.

Q. Six Year Old Grey Gelding

This horse won a $35,000 claiming race by a length. The horse was claimed and placed on the feed supplement. Within six weeks the horse ran in a maiden race and was beaten by two lengths to fourth place. After a further six weeks the horse ran in an allowance race and finished second. The horse has subsequently won two further allowance races by three lengths and one length respectively.

EXAMPLE THIRTEEN

Thirty horses within one stable were all placed on an oat-based diet that was supplemented with the oat-balancing feed supplement. Over of period of approximately nine months from the start of this dietary regime, the thirty horse ran a combined number of one hundred and twenty races. Of the one hundred and twenty races, twenty-one races were won, thirty races had second places and nineteen races had third places. Prior to beginning this dietary regime the horses had failed to perform at this level.

EXAMPLE FOURTEEN

Within four weeks of starting on a oat-based diet supplemented with oat-balancing feed supplement, this horse won a Maiden special race over 1 1/16 miles (1.71 km). Prior to starting this dietary regime the horse had had ten failed attempts at a race of this caliber. The nearest finish within the ten attempts was third place, where the horse was beaten by a total of nineteen lengths.

EXAMPLE FIFTEEN

This horse ran eight times as a three year old and failed to win on all occasions. The horse was placed on a diet supplemented by oat-balancing feed supplement. Approximately four weeks later the now four year old horse won a maiden special weight race by five lengths.

EXAMPLE SIXTEEN

After seven unplaced efforts, this horse was placed on a diet supplemented with oat-balancing feed supplement.

Within ten weeks the horse won a maiden special weight race by approximately two lengths.

EXAMPLE SEVENTEEN

After five unplaced efforts where the horse appeared significantly down the field, the horse was placed on an oat-balanced diet supplemented with oat-balancing feed supplement. Within three weeks the horse finished second in a one mile (1.6 km) maiden race, after a further six weeks the horse again finished second in a one mile (1.6 km) maiden race. The horse was beaten by three and a quarter lengths initially, then by three lengths. Finally within a further four weeks the horse won a mile (1.6 km) maiden race by three-quarters of a length, showing an improvement in racing form of at least four lengths.

EXAMPLE EIGHTEEN

A three year old standard bred horse was placed on an oat based diet supplemented with oat-balancing feed supplement. After four weeks the horse raced, won and recorded a time four seconds faster than his previous attempt. The horse also won his next race.

EXAMPLE NINETEEN

A four year old filly had raced eleven times including four unplaced efforts at Graded Stake level (Grade 3, Grade 2 and Grade 1 levels). She was placed on oat-balancing feed supplement. Within two months she ran a Grade 1 race and finished second. Within a second two month period, she ran two further Grade 1 races and finished second on both occasions.

EXAMPLE TWENTY

Fifty-five race horses from a single stable attended a thirty-six day racing meet. During the thirty-six days, forty five horses were kept on the stable's normal dietary regime while ten horses had their diet supplemented with the feed supplement. Two of the forty five horses won one race each within the thirty six days. Thirteen races including four stakes were won by the ten horses on the feed supplement within the same period of time.

EXAMPLE TWENTY ONE

A four year old filly ran fifteen races during a seven month period. She achieved third place in one of the fifteen races only. Oat-balancing feed supplement was introduced into her diet and within one month she won a two mile four furlong race (4 km) by a head.

EXAMPLE TWENTY TWO

The following table illustrates the performance results of a number of horses of various ages, running varying distances after their diets were supplemented with oat-balancing feed supplement. Prior to taking the oat-balancing feed supplement, all horses had failed to produce a good performance.

| Age of Horse | Distance Run | Distance Run | Result | Period of time on oat-balancing feed supplement |
| --- | --- | --- | --- | --- |
| 3 year old. | 1 miles | 1.6 km | Won | 3 months |
| 3 year old | 1 mile | 1.6 km | Won | 3 months |
| 3 year old | 1 mile | 1.6 km | Won | 3 months |
| 3 year old | 5 furlong | 1.0 km | Won | 3 months |
| 3 year old | 1 1/16 miles | 1.7 km | Won | 3 months |
| 3 year old | 7 furlong | 1.4 km | Won | 7½ months |
| 4 year old | 6 furlong | 1.2 km | Won | 6 weeks |
| 6 year old | 6 furlong | 1.2 km | Won | 7 weeks |
| 6 year old | 1 mile | 1.6 km | Won | 4 weeks |

It will of course be understood that the invention is not limited to the specific details as herein described, which are given by way of example only, and that various alternations and modifications may be made without departing from the scope of the invention as defined in the appended claims.

The invention claimed is:

1. An oat feed for equines, wherein the oat feed comprises oats and an oat-balancing feed supplement, in which the feed supplement comprises a mix of components including lysine, iodine, copper, magnesium, zinc and calcium, wherein the quantity of lysine in the feed supplement fed to the equines per day ranges from about 3.00 g to about 18.00 g according to the age of the equine and wherein the mix of components in the feed supplement are present in the following ranges relative to 1 g of lysine,

| | |
| --- | --- |
| Iodine | $5.3 \times 10^{-4}$-$7.9 \times 10^{-4}$ g |
| Copper | $5.3 \times 10^{-3}$-$7.9 \times 10^{-3}$ g |
| Magnesium | $2.1 \times 10^{-1}$-$3.2 \times 10^{-1}$ g |
| Zinc | $1.6 \times 10^{-2}$-$2.4 \times 10^{-2}$ g |
| Calcium | $5.3 \times 10^{-1}$-$8.0 \times 10^{-1}$ g. |

2. An oat feed as defined in claim 1, in which the components of the mix are present in the following optimal ratios calculated relative to 1 g lysine:—

| | |
| --- | --- |
| Iodine | $6.6 \times 10^{-4}$ g |
| Copper | $6.6 \times 10^{-3}$ g |
| Magnesium | $2.6 \times 10^{-1}$ g |
| Zinc | $2.0 \times 10^{-2}$ g |
| Calcium | $6.6 \times 10^{-1}$ g. |

3. An oat feed as defined in claim 1, in which the feed supplement further comprises one or more of the following substances:

| | |
| --- | --- |
| Vitamin A | Vitamin $B_{12}$ |
| Vitamin D | Biotin |
| Vitamin E | Vitamin C |
| Vitamin K | Cobalt |
| Folic Acid | Selenium |
| Nicotinic Acid | Methionine |
| Pantothenic Acid | Threonine |
| Thiamine | Choline |
| Riboflavin | Iron |
| Pyridoxine | Manganese. |

4. An oat feed as defined in claim 3, in which the one or more substances is present in the following ratio ranges relative to 1 g lysine:

|  | Optimal Ratio Range |
|---|---|
| Vitamin A | $2.7 \times 10^3$-$3.9 \times 10^3$ IU/g |
| Vitamin D | $2.7 \times 10^2$-$3.9 \times 10^2$ IU/g |
| Vitamin E | $1.0 \times 10^2$-$1.6 \times 10^2$ IU/g |
| Vitamin K | $2.7 \times 10^{-4}$-$3.9 \times 10^{-4}$ g |
| Folic Acid | $0.8 \times 10^{-2}$-$1.2 \times 10^{-2}$ g |
| Nicotinic Acid | $5.3 \times 10^{-3}$-$7.9 \times 10^{-3}$ g |
| Pantothenic Acid | $2.1 \times 10^{-3}$-$3.1 \times 10^{-3}$ g |
| Thiamine | $2.1 \times 10^{-3}$-$3.1 \times 10^{-3}$ g |
| Riboflavin | $2.6 \times 10^{-3}$-$3.8 \times 10^{-3}$ g |
| Pyndoxine | $1.3 \times 10^{-3}$-$1.9 \times 10^{-3}$ g |
| Vitamin B12 | $1.0 \times 10^{-3}$-$1.6 \times 10^{-3}$ g |
| Biotin | $2.1 \times 10^{-4}$-$3.1 \times 10^{-4}$ g |
| Vitamin C | $2.1 \times 10^{-1}$-$3.1 \times 10^{-1}$ g |
| Cobalt | $2.1 \times 10^{-4}$-$3.1 \times 10^{-2}$ g |
| Selenium | $1.0 \times 10^{-4}$-$1.6 \times 10^{-4}$ g |
| Methionine | $2.6 \times 10^{-1}$-$4.0 \times 10^{-1}$ g |
| Threonine | $2.6 \times 10^{-1}$-$4.0 \times 10^{-1}$ g |
| Choline | $4.2 \times 10^{-2}$-$6.4 \times 10^{-2}$ g |
| Iron | $1.6 \times 10^{-2}$-$2.4 \times 10^{-2}$ g |
| Manganese | $1.6 \times 10^{-2}$-$2.4 \times 10^{-2}$ g. |

5. An oat feed as defined in claim 3, in which the one or more substances is present in the following ratio calculated relative to 1 g lysine:

| | |
|---|---|
| Vitamin A | $3.3 \times 10^3$ IU/g |
| Vitamin D | $3.3 \times 10^2$ IU/g |
| Vitamin E | $1.3 \times 10^2$ IU/g |
| Vitamin K | $3.3 \times 10^{-4}$ g |
| Folic Acid | $1.0 \times 10^{-2}$ g |
| Nicotinic Acid | $6.6 \times 10^{-3}$ g |
| Pantothenic Acid | $2.6 \times 10^{-3}$ g |
| Thiamine | $2.6 \times 10^{-3}$ g |
| Riboflavin | $3.2 \times 10^{-3}$ g |
| Pyndoxine | $1.6 \times 10^{-3}$ g |
| Vitamin B12 | $1.3 \times 10^{-3}$ g |
| Biotin | $2.6 \times 10^{-4}$ g |
| Vitamin C | $2.6 \times 10^{-1}$ g |
| Cobalt | $2.6 \times 10^{-4}$ g |
| Selenium | $1.3 \times 10^{-4}$ g |
| Methionine | $3.3 \times 10^{-1}$ g |
| Threonine | $3.3 \times 10^{-1}$ g |
| Choline | $5.3 \times 10^{-2}$ g |
| Iron | $4.0 \times 10^{-2}$ g |
| Manganese | $2.0 \times 10^{-2}$ g. |

6. An oat feed as defined in claim 1, in which the gross weight of the oat-balancing feed supplement ranges between 5.4 g and 8.0 g relative to 1 g of lysine.

7. An oat feed as defined in claim 1, in which a filling material is combined with the components and any one of the further substances to bring the oat-balancing feed supplement to a gross weight ranging between 5.45 g and 8.0 g relative to 1 g of lysine.

8. An oat feed as defined in claim 7, in which the filling material is cereal wheat.

9. An oat feed as defined in claim 1, which is fed to a foal aged 3-6 months in an amount sufficient to provide the foal with 3.75 g±20% lysine per day.

10. An oat feed as defined in claim 1, which is fed to a foal aged 6-12 months in an amount sufficient to provide the foal with 7.5 g±20% lysine per day.

11. An oat feed as defined in claim 1, which is fed to a yearling aged 12-18 months in an amount sufficient to provide the yearling with 11.25 g±20% lysine per day.

12. An oat feed as defined in claim 1, which is fed to an adult equine aged 18+ months in an amount sufficient to provide the adult equine with 15 g±20% lysine per day.

13. An oat feed as defined in claim 1, in which the oat-balancing feed supplement is administered to the equines in conjunction with any oat-based diet.

* * * * *

UNITED STATES PATENT AND TRADEMARK OFFICE
CERTIFICATE OF CORRECTION

PATENT NO. : 7,601,373 B2　　　　　　　　　　　　　　　　　　　　　　　　　　Page 1 of 1
APPLICATION NO. : 10/502509
DATED : October 13, 2009
INVENTOR(S) : Richard McCormick It is certified that error appears in the above-identified patent and that said Letters Patent is hereby corrected as shown below:

Cover Page, Item (22), change "Jan 22, 2002" to --Jan. 22, 2003--.

Signed and Sealed this

Tenth Day of August, 2010

David J. Kappos
*Director of the United States Patent and Trademark Office*